W. M. BUTLER.
AUTOMATIC METAL TURNING MACHINE.
APPLICATION FILED JULY 13, 1916.
1,208,910.
Patented Dec. 19, 1916.
4 SHEETS—SHEET 1.
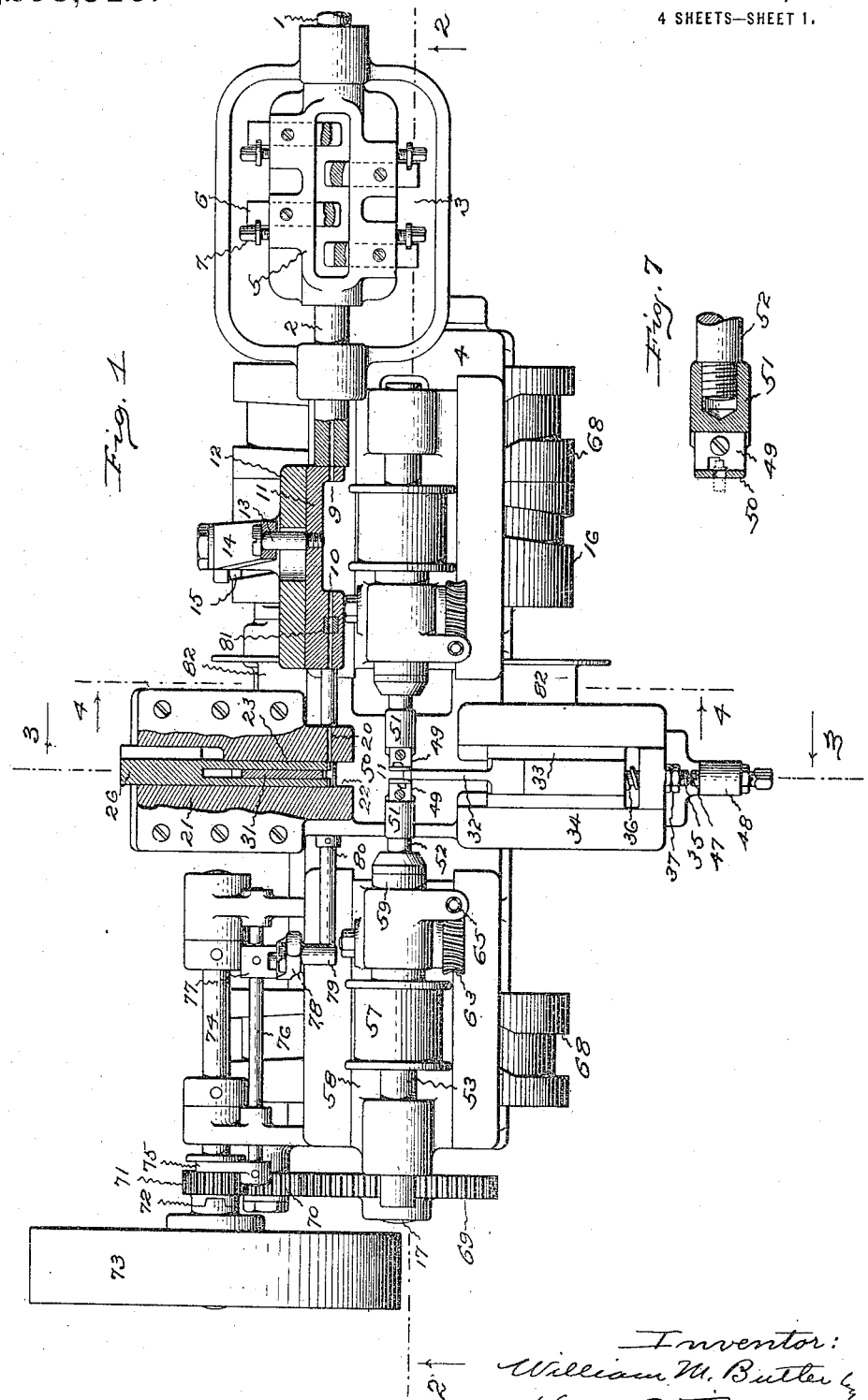
Inventor:
William M. Butler
Harry R. Williams
atty.

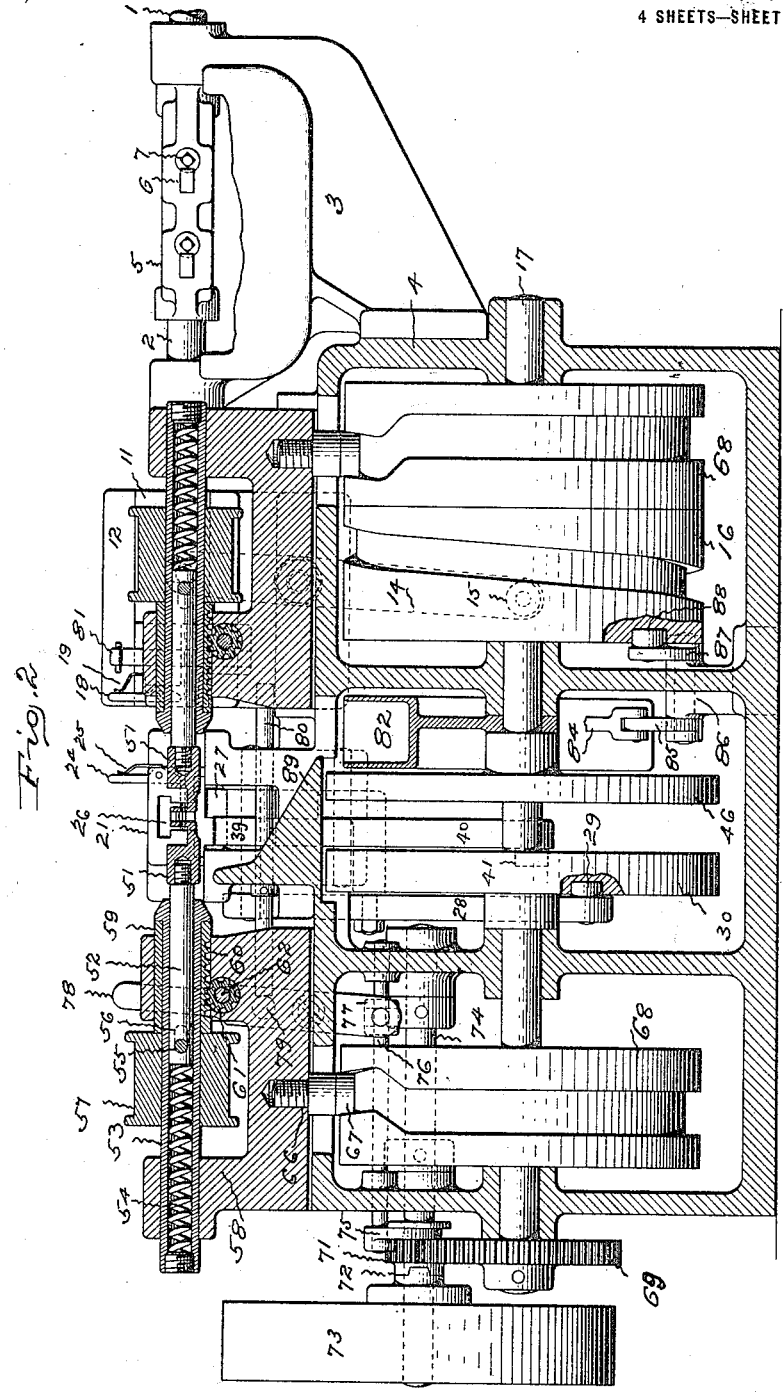

W. M. BUTLER.
AUTOMATIC METAL TURNING MACHINE.
APPLICATION FILED JULY 13, 1916.
1,208,910.
Patented Dec. 19, 1916.
4 SHEETS—SHEET 3.
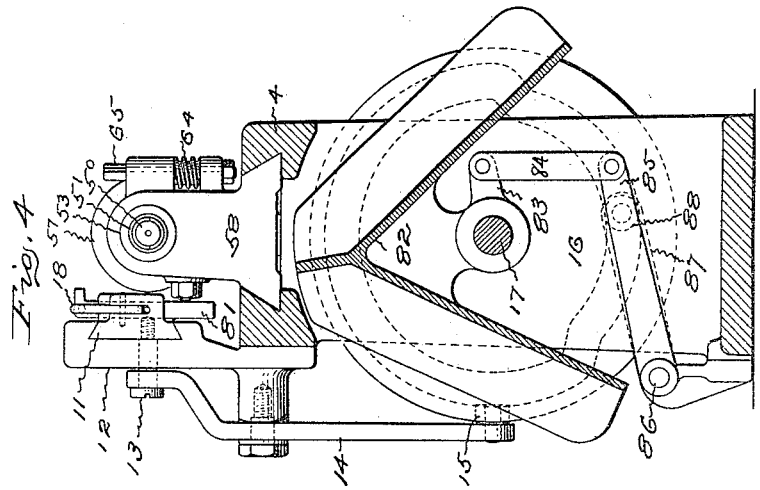
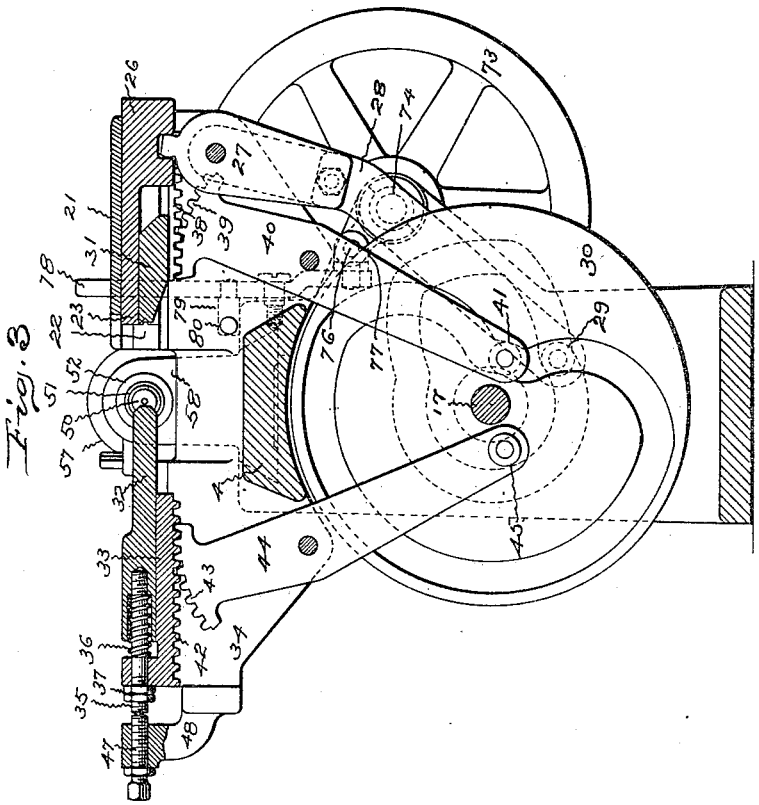
Inventor:
William M. Butler by
Harry P. Williams
atty.

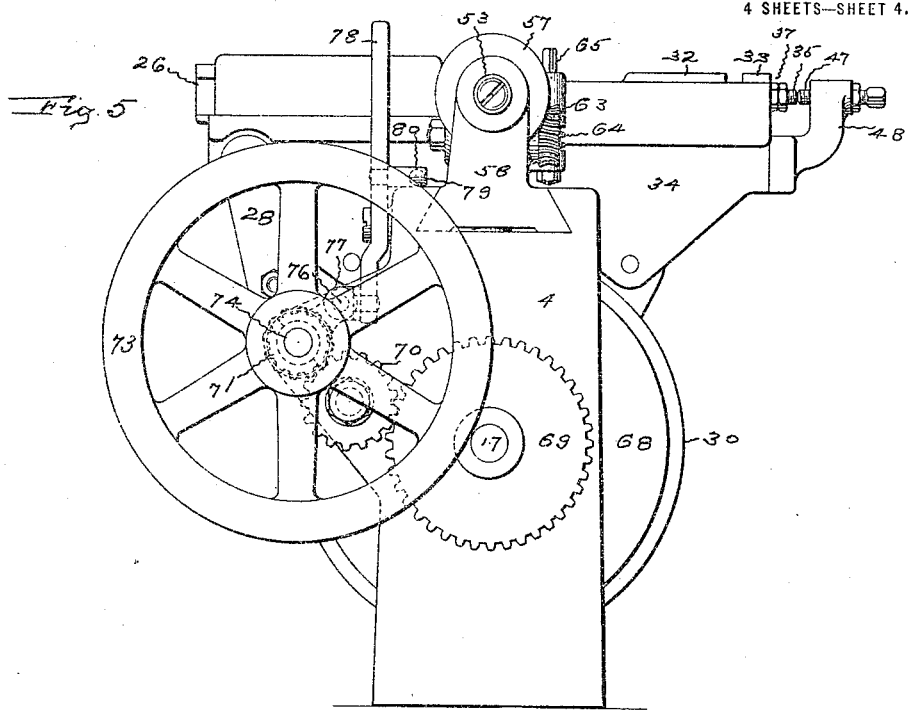
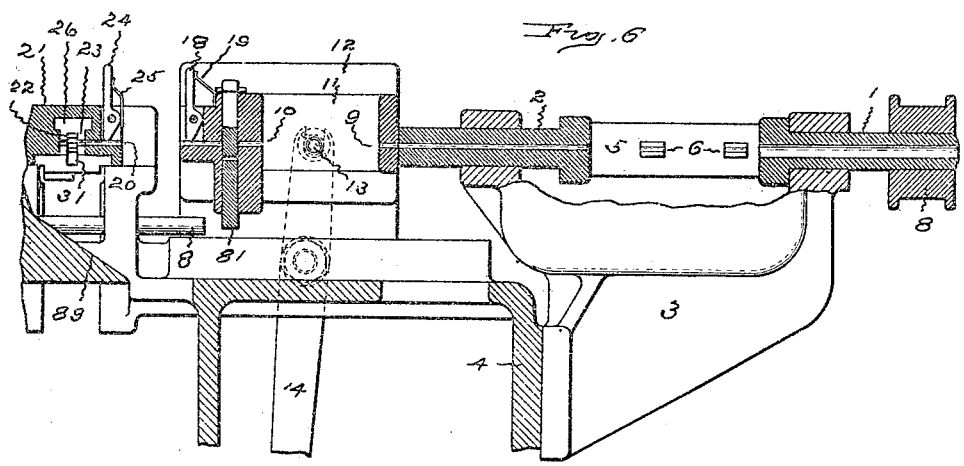

UNITED STATES PATENT OFFICE.

WILLIAM M. BUTLER, OF HARTFORD, CONNECTICUT, ASSIGNOR TO THE WHITNEY MANUFACTURING COMPANY, OF HARTFORD, CONNECTICUT, A CORPORATION OF CONNECTICUT.

AUTOMATIC METAL-TURNING MACHINE.

1,208,910. Specification of Letters Patent. Patented Dec. 19, 1916.

Application filed July 13, 1916. Serial No. 109,038.

*To all whom it may concern:*

Be it known that I, WILLIAM M. BUTLER, a citizen of the United States, residing at Hartford, in the county of Hartford and State of Connecticut, have invented a new and useful Improvement in Automatic Metal-Turning Machines, of which the following is a specification.

This invention relates to a machine for automatically forming large quantites of small metal pieces, such for example as pivot pins, shouldered studs, arbors and rivets, of exact size from a continuous length of wire.

The object of the invention is to provide a machine of this nature which will very rapidly cut off blanks and turn down and square off their ends so that they will be of exact diameter and length.

The machine illustrated as embodying the invention is particularly designed for forming small pivot pins or shouldered studs which are used in the manufacture of drive chains, although it is adaptable for the manufacture of similar pieces for other purposes. As such pieces are subsequently used in mechanisms which require freedom of movement, yet accuracy of fit, their ends must be absolutely uniform as to center, diameter and length. In this machine a continuous length of wire is drawn in through a straightening mechanism and when the inner end engages a stop a piece is cut off slightly longer than the finished piece. The severed piece is grasped and carried into line with two rapidly revolved cutters which are fed up so as to turn down and turn off both ends of the firmly held and accurately centered piece. When the turning is completed the turning tools are withdrawn and the pieces released and allowed to drop out of the machine, the finished pieces being delivered on one side and the chips on the other. These operations are continued in succession as long as wire is fed, but when the end of the wire is reached the machine is automatically stopped.

Figure 1 of the accompanying drawings shows a plan of the machine with portions of the feed and cutting off mechanisms in section. Fig. 2 shows a front elevation of the machine with portions of the frame and the turning mechanisms cut away on the plane indicated by the dotted line 2—2 on Fig. 1. Fig. 3 shows a vertical section on the plane indicated by the dotted line 3—3 on Fig. 1. Fig. 4 is a vertical section on the plane indicated by the dotted line 4—4 on Fig. 1. Fig. 5 is an elevation looking toward the left hand end of the machine. Fig. 6 is a vertical longitudinal section taken through the straightening and feeding mechanisms showing the feed pawls, stop gate and front end of the cutter. Fig. 7 is an enlarged view of one of the turning tools.

The wire is drawn into the machine through the straightening mechanism at the top on the right hand side. This straightening mechanism consists of two tubular arbors 1 and 2 that are rotarily mounted in bearings in a bracket 3 which is fastened to the main frame 4. These tubular arbors are connected by a yoke 5 which carries straightening blocks 6 that are adjustable in and out by means of screws 7. The arbor 1 is provided with a pulley 8 by means of which the straightening mechanism may be rotated as the wire is being drawn through it so that the straightening blocks will act upon all sides of the wire and straighten it.

From the arbor 2 the wire leads through the openings 9 and 10 in the feed slide 11. This feed slide is movably held in a way in the front wall of a bracket 12 that is fastened to the main frame. A screw stud 13 connects the feed slide with the upper end of a lever 14 that at its lower end has a roll 15 which runs in a groove cut in the periphery of the cam drum 16 mounted on the cam shaft 17, the cam groove being suitably cut to cause the slide to draw back and move forward and intermittently feed the wire the required distance at the desired time. The feed slide has a pawl 18 that is arranged, and held by a spring 19, in such manner that when the slide is drawn back the pawl slips along the wire, but when the slide is pushed forward the pawl clamps the wire and carries it along. As the slide advances it carries the inner end of the wire through the guide opening 20 in one side of the cutter holding block 21 against the wall 22 of the other side of the block, in front of the cut-off blade 23. A pawl 24 is arranged on the block adjacent to the guide opening, and held by a spring 25 so as to prevent the withdrawal of the wire which has been fed when the feed slide moves backward.

The cut-off blade 23 is at the front edge of a slide 26 that is movable toward the front and back in a channel in the block 21. Engaging in a socket in the underside of the cutter slide is the upper end of a rocker arm 27 that is fastened to a lever 28, which at its lower end has a roll 29 that lies in a cam groove in one face of the disk 30 which is mounted on the cam shaft. When the cutter slide is moved forward the blade shears off the portion of the inner end of the wire that projects in front of it from the guide opening in the side of the cutter supporting block.

The piece of wire which is cut off is gripped between the end of the plate 31, that is mounted in the cutter supporting block and is movable back and forth in a slot in the cutter slide, and the end of the plate 32 that is mounted on the slide 33 which is supported in a guideway in a bracket 34 attached to the front of the frame of the machine. The front gripping plate 32, which is movable on the front slide 33, has a stem 35 that projects from its front end through a portion of the slide. A spring 36 on this stem normally tends to thrust the gripping plate backward, the amount of this movement being determined by the position of the nuts 37 that are on the outer end of the stem. On the underside of the rear gripping plate 31 is a rack 38 which is engaged by a toothed segment 39 on the upper end of a lever 40, the lower end of which has a roll 41 that lies in a groove in one face of the cam disk 30, and the front gripping plate slide on its underside has a rack 42 which is engaged by a toothed segment 43 on the upper end of a lever 44, the lower end of which has a roll 45 lying in a groove in one face of the cam disk 46. The grooves in the cam disks are so timed that the front gripping plate moves back and coöperates with the rear gripping plate to grasp the piece of wire as it is being severed by the cutter, and then the two gripping plates move forward and carry the severed piece into line with the turning tools. Owing to the spring between the front slide and the front gripping plate the piece of stock which is cut off is held with a yielding pressure that is determined by the force of the spring until the piece which is being carried forward is in line with the cutting tools, at which time the front end of the stem that projects forwardly from the front gripping plate engages the stop screw 47 adjustably mounted in a bracket 48 at the front of the machine. Then the front gripping plate is held solidly so that the piece of stock will be gripped with great pressure between the plates in line with the turning tools.

The piece is finished by rotating box tools which act upon its opposite ends. Each of these tools has a blade 49 shaped to turn down the sides of the piece near the end and to turn off the end squarely. In front of the turning blade is a centering plate 50. Each tool head 51 is fastened to the end of a stem 52 that has a slight longitudinal movement in a tubular spindle 53. A spring 54 in the spindle thrusts against the end of the stem of the tool head and tends to press it outward, the amount of this movement being determined by the pin 55 that projects from the stem into a slot 56 in the spindle. Each spindle is provided with a pulley 57 by means of which it and the tool head which it carries may be rotated. Each spindle has its tail end rotarily mounted directly in one end of the slide 58 and has its head end rotarily mounted in a sleeve 59 that is arranged in the slide so that it may be adjusted longitudinally. On the underside of this sleeve is a rack 60 engaged by a pinion 61 on an arbor 62 which at the front of the machine has a worm wheel 63. This worm wheel is engaged by a worm 64 on the lower end of a screw 65 which turns in the slide. By turning this screw the sleeve and the spindle may be adjusted longitudinally with relation to the slide so as to locate the tool head in the necessary position. The slides which carry the turning tools are provided with studs 66 having rolls 67 which lie in cam slots in the periphery of the cam drums 68 on the cam shaft.

On one end of the cam shaft is a gear 69 which through the intermediate gear 70 is driven by a pinion 71 that by a clutch 72 is connected with the driving pulley 73. The pinion 71 and one clutch part are slidably mounted on the shaft 74 and are engaged by a fork 75 on the end of a sliding rod 76 which carries a block 77 that engages the lower end of a lever 78 pivoted to the frame. Projecting from this lever is a stud 79 that is designed to be engaged by the end of a rod 80. When the clutch parts are engaged and the machine is running the lever 78 pushes the rod 80 forward. By turning the lever to the left the clutch may be disengaged by hand so as to stop the machine. In the feed slide is a gate 81, and the wire when feeding passes through an opening in this gate. While there is wire in the machine the gate is held up. When the end of the wire is reached the gate being then unsupported drops and at the next forward movement of the feed slide the lower end of the gate strikes the rod and causes it to push the lever to the left so as to automatically disengage the clutch and cause the machine to stop.

Pivotally hung on the cam shaft near the center of the machine is a Y-shaped trough 82. The hub of this trough has a rocker arm 83 that by a link 84 is connected with a rocker arm 85. This rocker arm is on one end of an arbor 86, the other end of which has a lever 87 provided with a roll 88 that runs in a groove in one face of the cam drum 16. By means of this mechanism the trough is tilted first one way and then the other way so as to discharge the chips on one side and the finished pieces on the other side, which pieces as they are dropped from the gripping plates slide down the inclined wall 89 into the trough. In this machine the wire is first straightened by the rotating straightening mechanism, the straightening blocks being adjusted according to the diameter of the wire to affect this result. The feed mechanism which draws the wire in carries the wire until its inner end engages a positive stop and is definitely located, where it is firmly held while the slide returns for the subsequent feed. The pieces are cut off by the forward movement of the cutting off blade to approximately the length of the finished pieces, and they are carried forward and held firmly in line with the turning tools. When the slides carrying the turning tools move up, the centering plates pass onto the ends of the wire, and the tools which are forced back when they start to cut are advanced by the springs with a yielding pressure, as they turn off the sides of the ends and square up the ends of the piece, until they come to a definite stop. The turning tools are easily adjusted in the slides which carry them so that they will cut pieces of different lengths to the exact dimensions. The cutting tool blades may be readily changed for cutting different shapes on the ends of the pieces. The clutch may be thrown out by hand whenever it is desired to stop the machine, and it will be automatically thrown out whenever there is no wire passing in so as to hold up the stop gate. The finished pieces are discharged on one side of the machine and the chips which are turned off are discharged on the other side.

The invention claimed is:

1. In a machine for forming metal pieces, the combination of reciprocatory mechanism for intermittently feeding wire longitudinally, reciprocatory mechanism for intermittently forcing transversely and cutting off the end of the fed wire, reciprocatory mechanism for gripping the severed pieces of wire and carrying them transversely still farther, and rotatory and reciprocatory mechanism for turning the end of the pieces of wire carried by the gripping mechanism.

2. In a machine for forming metal pieces, the combination of reciprocatory mechanism for intermittently feeding wire longitudinally, reciprocatory mechanism for intermittently forcing transversely and cutting off the end of the fed wire, reciprocatory mechanism for gripping the severed pieces of wire and carrying them transversely still farther, and rotatory and reciprocatory mechanism for simultaneously turning the ends of the pieces of wire carried by the gripping mechanism.

3. In a machine for forming metal pieces, the combination of rotatory mechanism for straightening wire, reciprocatory mechanism for intermittently feeding the straightened wire longitudinally, reciprocatory mechanism for intermittently cutting off the end of the fed wire, reciprocatory mechanism for gripping the severed pieces of wire and carrying them transversely, and rotatory and reciprocatory mechanism for turning the end of the pieces of wire carried by the gripping mechanism.

4. In a machine for forming metal pieces, the combination of reciprocatory mechanism for intermittently feeding wire longitudinally, reciprocatory mechanism for intermittently cutting off the end of the fed wire, reciprocatory mechanism for gripping the severed pieces of wire and carrying them transversely, rotatory and reciprocatory mechanism for turning the end of the pieces of wire carried by the gripping mechanism, and mechanism engaged and actuated by the feed mechanism for stopping the machine when the end of the wire is reached.

5. In a machine for forming metal pieces, the combination of rotatory mechanism for straightening wire, reciprocatory mechanism for intermittently feeding the straightened wire longitudinally, reciprocatory mechanism for intermittently cutting off the end of the fed wire, reciprocatory mechanism for gripping the severed pieces of wire and carrying them transversely, rotatory and reciprocatory mechanism for turning the end of the pieces of wire carried by the gripping mechanism, and mechanism engaged and actuated by the feed mechanism for stopping the machine when the end of the wire is reached.

6. In a machine for forming metal pieces, the combination of reciprocatory mechanism for intermittently feeding wire longitudinally, reciprocatory mechanism for intermittently cutting off the end of the fed wire, reciprocatory mechanism for gripping the severed pieces of wire and carrying them transversely, rotatory and reciprocatory mechanism for turning the end of the pieces of wire carried by the gripping mechanism, and oscillatory mechanism for discharging the finished pieces and the chips.

7. In a machine for forming metal pieces, the combination of rotatory mechanism for straightening wire, reciprocatory mechanism for intermittently feeding the straightened wire longitudinally, reciprocatory mechanism for intermittently cutting off the end of the fed wire, reciprocatory mechanism for gripping the severed pieces of wire and carrying them transversely, rotatory and reciprocatory mechanism for turning the end of the pieces carried by the gripping mechanism, oscillatory mechanism for discharging the finished pieces and the chips, and mechanism engaged and actuated by the feed mechanism for stopping the machine when the end of the wire is reached.

8. In a machine for forming metal pieces, the combination with mechanism for intermittently feeding wire longitudinally, mechanism for intermittently cutting off the end of the fed wire, mechanism for gripping the severed pieces of wire and carrying them transversely, and mechanism for turning the ends of the pieces of wire, of a yoke, adjustable straightening blocks carried by the yoke, tubular arbors supporting the yoke, and means for rotating the yoke.

9. In a machine for forming metal pieces, the combination with mechanism for straightening wire, mechanism for intermittently cutting off the end of the wire, mechanism for gripping the severed pieces of wire and carrying them transversely, and mechanism for turning the ends of pieces of wire, of a feed slide, mechanism for reciprocating the slide, a feed pawl carried by the slide, and a stop gate carried by the feed slide and adapted to move across the path of the wire through the feed slide.

10. In a machine for forming metal pieces, the combination with mechanism for intermittently feeding wire, of a block having a guide opening for the wire, a stop for the end of the wire, a pawl for preventing the backward movement of the wire, a cutter for severing the wire, mechanism for gripping the severed pieces of wire, and mechanism for turning the ends of the pieces of wire.

11. In a machine for forming metal pieces, the combination with mechanism for intermittently feeding wire, mechanism for intermittently cutting off the end of the fed wire, and mechanism for turning the ends of the pieces of wire, of a gripping plate movable back and forth independent of but coöperating with the cutting mechanism behind the wire, a gripping plate movable back and forth in front of the wire, and mechanism for reciprocating the plates and causing them to grip and carry the severed pieces of wire from the cutting mechanism into line with the turning mechanism.

12. In a machine for forming metal pieces, the combination with mechanism for intermittently feeding wire, mechanism for intermittently cutting off the end of the fed wire, and mechanism for turning the ends of the pieces of wire, of a plate movable back and forth back of the wire, a plate movable back and forth in front of the wire, a slide carrying the front plate, a yielding connection between the front plate and slide, and means for reciprocating the back plate and slide and causing the plates to grip and carry the severed pieces from the cutting mechanism into line with the turning mechanism.

13. In a machine for forming metal pieces, the combination with mechanism for intermittently feeding wire, mechanism for intermittently cutting off the end of the fed wire, and mechanism for gripping the severed pieces of wire and carrying them into line with the turning tools, of turning tools, tubular spindles carrying the turning tools, means for rotating the spindles, slides adjustably carrying said spindles, and mechanism for reciprocating the slides.

14. In a machine for forming metal pieces, the combination with mechanism for intermittently feeding wire, mechanism for intermittently cutting off the end of the fed wire, and mechanism for gripping the severed pieces of wire and carrying them into line with turning tools, of turning tools, tubular spindles carrying the turning tools, yielding connections between the tools and spindles, means for rotating the spindles, slides adjustably carrying the spindles, and mechanism for reciprocating the slides.

15. In a machine for forming metal pieces, the combination with mechanism for intermittently feeding wire, mechanism for intermittently cutting off the end of the fed wire, and mechanism for gripping the severed pieces of wire and carrying them into line with turning tools, of turning tools, tubular spindles carrying the turning tools, yielding connections between the tools and spindles, means for rotating the spindles, slides carrying the spindles, means for adjusting the spindles longitudinally in the slides, and mechanism for reciprocating the slides.

16. In a machine for forming metal pieces, the combination with mechanism for intermittently feeding wire, mechanism for intermittently cutting off the end of the wire, mechanism for gripping the severed pieces of wire and carrying them transversely, and rotatory and reciprocatory mechanism for turning the end of the pieces carried by the gripping mechanism, of a Y-shaped trough below the turning mechanism, and mechanism for oscillating said trough.

17. In a machine for forming metal pieces, the combination with mechanism for intermittently feeding wire, mechanism for intermittently cutting off the end of the fed wire, mechanism for gripping the severed pieces of wire and carrying them transversely, and mechanism for turning the end of the pieces of wire carried by the gripping mechanism, of a stop gate carried by the feed mechanism and adapted to be held raised by the wire, a rod adapted to be engaged by the stop gate when no wire is being fed, and a clutch adapted to be released when the stop gate engages said rod.

18. In a machine for forming metal pieces, the combination with mechanism for intermittently feeding wire, mechanism for intermittently cutting off the end of the fed wire, and mechanism for gripping the severed pieces of wire and carrying them into line with turning tools, of turning tools, tubular spindles carrying the turning tools, yielding connections between the tools and spindles, means for rotating the spindles, longitudinally movable sleeves supporting the spindles, means for moving the sleeves longitudinally, slides carrying the sleeves, and mechanism for reciprocating the slides.

19. In a machine for forming metal pieces, the combination of turning tools, tubular spindles carrying the turning tools, yielding connections between the tools and spindles, means for rotating the spindles, slides carrying the spindles, means for adjusting the spindles longitudinally in the slides, and mechanism for reciprocating the slides.

20. In a machine for forming metal pieces, the combination of a plate movable back and forth back of the pieces, a plate movable back and forth in front of the pieces, a slide carrying the front plate, a yielding connection between the front plate and slide, and means for reciprocating the back plate and the slide and causing the plates to move toward each other for gripping the pieces and move together to carry the gripped pieces transversely.

21. In a machine for forming metal pieces, the combination with feeding, cutting, gripping, transferring and turning mechanisms, of a yoke, adjustable straightening blocks carried by the yoke, tubular arbors supporting the yoke, and means for rotating the yoke.

22. In a machine for forming metal pieces, the combination with straightening, cutting, gripping, transferring and turning mechanisms, of a feed slide, mechanism for reciprocating the slide, a feed pawl carried by the slide, and a stop gate carried by the feed slide and adapted to move across the path of the wire through the feed slide.

WILLIAM M. BUTLER.

Copies of this patent may be obtained for five cents each, by addressing the "Commissioner of Patents, Washington, D. C."